US005798848A

United States Patent [19]

Ouchi

[11] Patent Number: 5,798,848
[45] Date of Patent: Aug. 25, 1998

[54] FACSIMILE SYSTEM HAVING A FACSIMILE MACHINE AND AN EXTERNAL DATA PROCESSING DEVICE

[75] Inventor: Tetsuya Ouchi, Tajimi, Japan

[73] Assignee: Brother Kogyo Kabushiki Kaisha, Nagoya, Japan

[21] Appl. No.: 616,307

[22] Filed: Mar. 15, 1996

[30] Foreign Application Priority Data

Mar. 20, 1995 [JP] Japan .................................... 7-061344

[51] Int. Cl.$^6$ ............................................. H04M 11/00
[52] U.S. Cl. ................................. 358/468; 358/400
[58] Field of Search ......................... 358/468, 434–436, 358/442–444, 400

[56] References Cited

U.S. PATENT DOCUMENTS 5,199,063  3/1993  Erickson et al. ..................... 379/100
5,499,108  3/1996  Cotte et al. ......................... 358/400

Primary Examiner—David K. Moore
Assistant Examiner—Stephen Brinich
Attorney, Agent, or Firm—Oliff & Berridge, PLC

[57] ABSTRACT

A method of inputting one or more sets of operation control data needed to control one or more operations of a facsimile machine, including the steps of connecting an external data processing device to the facsimile machine, and operating the data processing device to input the operation control data and send the operation control data to the facsimile machine. A facsimile system including a facsimile machine including a data memory which stores one or more sets of operation control data needed to control one or more operations of the facsimile machine, and an external data processing device which is connectable to the facsimile machine and which is operable to input the operation control data and send the operation control data to the facsimile machine.

34 Claims, 12 Drawing Sheets

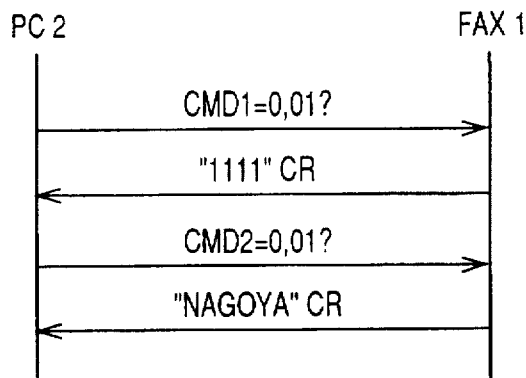
FIG. 5
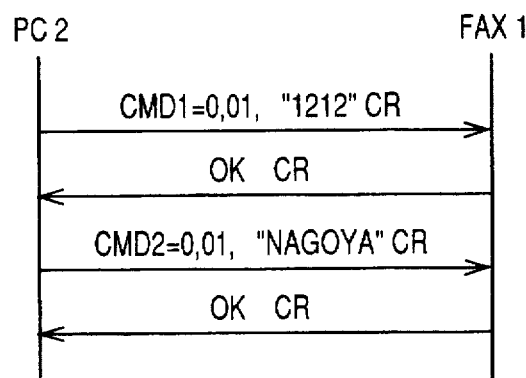
FIG. 6
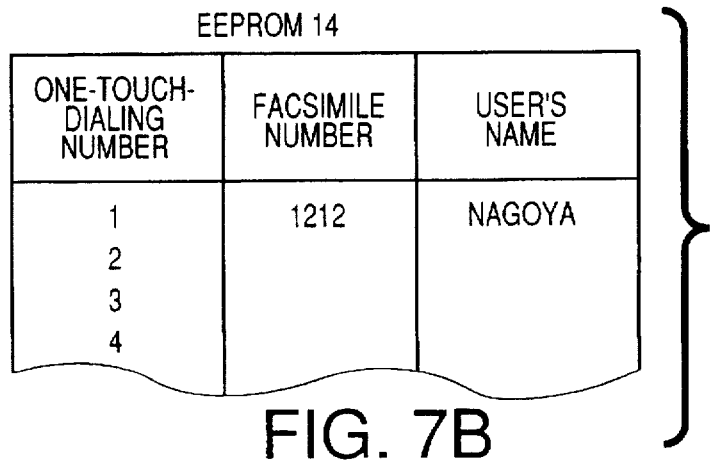
FIG. 7A
FIG. 7B

FACSIMILE SYSTEM HAVING A FACSIMILE MACHINE AND AN EXTERNAL DATA PROCESSING DEVICE

BACKGROUND OF THE INVENTION

1. Field of the Invention

The present invention relates to a facsimile apparatus which is connectable to an external data processing device such as a personal computer.

2. Related Art Statement

There is known a facsimile machine (hereinafter, abbreviated to the "first FAX") including an interface (e.g., input and output (I/O) port) which is connectable via a cable to a personal computer (hereinafter, abbreviated to the "PC") so as to interchange signals or data with the PC. Image data which are input through the PC may be sent to the first FAX, so that the image data are further sent to another facsimile machine (hereinafter, referred to as the "second FAX") via a communication line such as a telephone line. Conversely, image data which are sent from the second FAX to the first FAX may further be sent to the PC, depending upon a selected mode of the first FAX, so that the image data are stored in a memory of the PC. In those cases, the first FAX only functions as a modem device for the data communication.

Generally, a facsimile machine has numeral keys and function keys on an operator's panel thereof, and those keys are used to input or change various sorts of operation control data needed to control various sorts of operations of the facsimile machine. For example, the first FAX may have keys which are used to register a one-touch-dialing number and/or a speed-dialing number in association with a name of a user of the second FAX and/or a dialing number (i.e., facsimile number) of the second FAX. Also, the keys may be operated, as needed, to change data indicative of a name of a user of the first FAX, data indicative of a need to output an operation summary report, data indicative of a need to output a communication success and error report, data indicative of a ring volume of the first FAX, data indicative of a speaker volume of the first FAX, etc.

However, generally, a facsimile machine has only a small number of keys on an operator's panel thereof. Accordingly, various sorts of functions should be selected or established by operating the limited number of keys. Therefore, the above-described inputting or changing of the operation control data should be carried out by simultaneously operating an increased number of keys. For example, the above-described registering of the one-touch-dialing and/or speed-dialing numbers should be conducted by inputting alphabet letters (e.g., user's name of the second FAX) and/or numerals (e.g., dialing number of the second FAX) using the keys. However, this is very cumbersome to the operator or user.

In addition, the first FAX has only a very small display such as a 16-digit liquid crystal display (LCD). Accordingly, only a limited number of characters may be displayed concurrently on the display. Therefore, it is very cumbersome for the user to confirm on the display that each sort of operation control data registered or stored in the first FAX is correct.

On the other hand, the PC that is connectable to the first FAX may include a keyboard as a data input device thereof. The keyboard has a large number of data input keys which include a number of character keys and various sorts of function keys. Accordingly, it is very easy for the user to input various sorts of data using the keys. In addition, procedures or manners in which various sorts of data are input using the keys, and an I/O port which connects between the first FAX and the PC may be standardized. Moreover, in the case where the PC has a large display, a large number of characters may be displayed on the display of the PC and accordingly it is very easy for a user to confirm that the various sorts of data stored in the PC are correct.

However, the prior PC cannot be used to input or change various sorts of operation control data which are needed to control various operations of the first FAX and are stored in a memory of the FAX.

SUMMARY OF THE INVENTION

It is therefore a first object of the present invention to provide a method of inputting operation control data needed to control an operation of a facsimile machine, by operating an external data processing device connected to the facsimile machine.

It is a second object of the present invention to provide a facsimile system which includes a facsimile machine and an external data processing device which are connectable to each other so that the data processing device is operated to input operation control data needed to control an operation of the facsimile machine.

It is a third object of the present invention to provide a facsimile machine which is connectable to an external data processing device which is operable to change operation control data needed to control an operation of the facsimile machine.

It is a fourth object of the present invention to provide a data processing apparatus which is connectable to a facsimile machine and which is operable to change operation control data needed to control an operation of the facsimile machine.

The above first object has been achieved according to a first aspect of the present invention, which provides a method of inputting at least one set of operation control data needed to control at least one operation of a facsimile machine, comprising the steps of connecting an external data processing device to the facsimile machine, and operating the data processing device to input the operation control data and send the operation control data to the facsimile machine.

In the method in accordance with the first aspect of the invention, the operation control data needed to control the operation of the facsimile machine can be input through the external data processing device connected to the facsimile machine and be sent from the data processing device to the facsimile machine. In contrast, in the above-described prior facsimile machine, operation control data could be input only by operating the keys on the operator's panel thereof. Thus, the present method provides a novel manner in which operation control data are input to a facsimile machine. The external data processing device may comprise a personal computer.

According to a preferred feature of the first aspect of the invention, the method further comprises the steps of storing the operation control data in a data memory of the facsimile machine, and sending the operation control data stored in the data memory, to the data processing device including a display, so that an image corresponding to the operation control data is displayed on the display, and the step of operating the data processing device comprises a step of operating the data processing device to input data to change the operation control data and send the changed operation control data to the facsimile machine so that the changed operation control data are stored in the data memory of the facsimile machine.

The above second object has been achieved according to a second aspect of the present invention, which provides a facsimile system comprising a facsimile machine including a data memory which stores at least one set of operation control data needed to control at least one operation of the facsimile machine, and an external data processing device which is connectable to the facsimile machine and which is operable to input the operation control data and send the operation control data to the facsimile machine.

The facsimile system in accordance with the second aspect of the invention enables a user to easily input the operation control data by operating the data processing device. The data processing device may comprise a personal computer.

According to a preferred feature of the second aspect of the invention, the facsimile machine comprises a first transmitter which transmits the operation control data stored in the data memory, to the data processing device, and the data processing device comprises a receiver which receives the operation control data transmitted from the facsimile machine, a display which displays an image corresponding to the received operation control data, an input device which is operable for inputting data to change the received operation control data, and a second transmitter which transmits the changed operation control data to the facsimile machine so that the changed operation control data are stored in the data memory of the facsimile machine.

According to another feature of the second aspect of the invention, the data processing device further comprises judging means for judging whether the input device has been operated for the received operation control data, and the second transmitter transmits the operation control data to the facsimile machine when the judging means judges that the input device has been operated and does not transmit the operation control data to the facsimile machine when the judging means judges that the input device has not been operated. Alternatively, the second transmitter may be adapted to transmit, to the facsimile machine, the operation control data which are associated with first data indicating that the judging means has judged that the input device has been operated, or second data indicating that the judging means has judged that the input device has not been operated.

According to another feature of the second aspect of the invention, the facsimile machine comprises a first display and the data processing device comprises a second display having a screen area larger than that of the first display of the facsimile machine.

The above third object has been achieved according to a third aspect of the present invention, which provides a facsimile machine comprising a connector which is adapted to be connected to an external data processing device, a data memory which stores at least one set of operation control data needed to control at least one operation of the facsimile machine, a transmitter which reads the operation control data from the data memory and transmits the operation control data to the data processing device via the connector, and a receiver which receives changed operation control data changed by, and sent from, the data processing device and stores the changed operation control data in the data memory.

In the facsimile machine in accordance with the third aspect of the invention, the operation control data stored in the data memory are transmitted to the data processing device, so that an image corresponding to the operation control data is displayed on a display of the data processing device and a user operates the data processing device to input data to change the operation control data and send the changed operation control data to the facsimile machine. The receiver receives the changed operation control data changed by, and sent from, the data processing device and automatically stores the changed operation control data in the data memory. Thus, the data processing device is easily operable to change the operation control data, thereby solving the problem that the operation control data must be changed with difficulty by operating the keys on the operator's panel of the prior facsimile machine.

According to a preferred feature of the third aspect of the invention, the connector comprises an input and output (I/O) port which is connectable to a personal computer as the external data processing device.

According to another feature of the third aspect of the invention, the receiver comprises a buffer memory which temporarily stores the changed operation control data, and the data memory comprises a non-volatile memory which maintains the operation control data after the facsimile machine is disconnected from an electric power source. Since the operation control data transmitted from the external data processing device are temporarily stored in the buffer memory of the facsimile machine, the data communications between the facsimile machine and the data processing device are carried out with reliability, i.e., with minimized communication troubles. In addition, since the operation control data are stored in the non-volatile memory which maintains the data even if the facsimile machine is disconnected from the power source, the data are maintained with reliability.

According to another feature of the third aspect of the invention, the receiver comprises judging means for judging, when receiving a set of operation control data from the data processing device, whether the received set of operation control data is a changed set of operation control data, and storing means for storing, in the data memory, the received set of operation control data judged to be the changed set of operation control data, and discarding the received set of operation control data judged to be not the changed set of operation control data.

According to another feature of the third aspect of the invention, the receiver comprises storing means for storing, in the data memory, a set of operation control data received from the data processing device, irrespective of whether the received set of operation control data has been changed by the user by using the data processing device.

According to another feature of the third aspect of the invention, the data memory stores each of a plurality of sets of operation control data needed to control a corresponding one of a plurality of operations of the facsimile machine, the transmitter reads the sets of operation control data from the data memory and transmits the sets of operation control data to the data processing device, so that a plurality of images corresponding to the sets of operation control data are displayed on a display of the data processing device and the user operates the data processing device to input data to change at least one of the sets of operation control data and send, to the facsimile machine, the sets of operation control data including the changed set of operation control data, and the receiver receives, from the data processing device, the sets of operation control data including the changed set of operation control data and stores the changed set of operation control data in the data memory.

According to another feature of the third aspect of the invention, the receiver comprises judging means for judging whether each of the sets of operation control data received from the data processing device, is a changed set of operation control data, and storing means for storing, in the data memory, the each set of operation control data judged to be the changed set of operation control data, and discarding the each set of operation control data judged to be not the changed set of operation control data. The judging means may comprise means for judging whether the each set of operation control data received from the data processing device is the changed set of operation control data, by comparing the each set of operation control data with a corresponding one of the sets of operation control data currently stored in the data memory. Alternatively, the judging means may comprise means for judging whether the each set of operation control data received from the data processing device is associated with first data indicating that the received set of operation control data is a changed set of operation control data, or second data indicating that the received set of operation control data is not a changed set of operation control data. In the latter case, the storing means may comprise means for storing, in the data memory, the received set of operation control data associated with the first data and discarding the received set of operation control data associated with the second data.

According to another feature of the third aspect of the invention, the receiver comprises storing means for storing, in the data memory, each of the sets of operation control data received from the data processing device, in place of a corresponding one of the sets of operation control data currently stored in the data memory, irrespective of whether the each set of operation control data has been changed by the user by using the data processing device.

According to another feature of the third aspect of the invention, the data memory comprises a plurality of memory areas each of which stores a corresponding one of a plurality of sets of operation control data needed to control a corresponding one of a plurality of operations of the facsimile machine, and the transmitter reads the sets of operation control data from the data memory and transmits the sets of operation control data to the data processing device, so that a plurality of images corresponding to the sets of operation control data are displayed on a display of the data processing device and the user operates the data processing device to input the data to change at least two of the sets of operation control data and send, to the facsimile machine, the sets of operation control data including the changed sets of operation control data, and wherein the receiver stores, when receiving the changed sets of operation control data from the data processing device, each of the changed sets of operation control data in a corresponding one of the memory areas of the data memory. In this case, the operator or user can change, when appropriate, a desired set or sets of operation control data stored in the data memory of the facsimile machine.

According to another feature of the third aspect of the invention, the data memory comprises a memory device which stores the operation control data comprising designating-operation control data needed to designate a called station. The memory device may store, as the designating-operation control data, (a) data indicative of a dialing number of the called station, and (b) data indicative of a user's name of the called station.

According to another feature of the third aspect of the invention, the data memory comprises a memory device which stores the operation control data comprising calling-operation control data commonly needed to call each of a plurality of different called stations. The memory device stores the calling-operation control data selected from the group consisting of (a) data indicative of whether a pulse-dialing mode is selected, and (b) data indicative of whether an auto-redialing mode is selected.

According to another feature of the third aspect of the invention, the data memory comprises a memory device which stores the operation control data comprising data needed to operate the facsimile machine when the facsimile machine is called by a calling station.

According to another feature of the third aspect of the invention, the memory device stores the operation control data selected from the group consisting of (a) data indicative of a number of rings before answer, (b) data indicative of a ring volume, and (c) data indicative of a speaker volume.

The above fourth object has been achieved according to a fourth aspect of the present invention, which provides a data processing apparatus comprising a connector which is adapted to be connected to a facsimile machine, a receiver which receives, from the facsimile machine via the connector, at least one set of operation control data needed to control at least one operation of the facsimile machine, a display which displays a first image corresponding to the received operation control data, an input device which is operable for inputting data to change the received operation control data, the display displaying a second image corresponding to the changed operation control data, and a transmitter which transmits the changed operation control data to the facsimile machine via the connector.

In the data processing apparatus in accordance with the fourth aspect of the invention, a user can operate the input device to input data to change the operation control data received from the facsimile machine, while viewing the image corresponding to the received operation control data, on the display. Thus, the user can easily change the operation control data by operating the data processing apparatus, and send the changed data from the data processing apparatus to the facsimile machine. The user can easily judge, from the image displayed on the display, whether the received operation control data should be changed or not.

According to a preferred feature of the fourth aspect of the invention, the connector comprises a terminal which is connectable to the facsimile machine via a cable.

According to another feature of the fourth aspect of the invention, the display comprises means for displaying the first and second images each of which includes at least one item corresponding to the at least one operation of the facsimile machine. The item corresponding to the operation of the facsimile machine may be an indication such as "name (of a user of a called fax)" or "fax number (of the called fax)" and be associated with a blank or space which is to be filled with a specific name or a specific fax number which is input by the user by operating the input device.

According to another feature of the fourth aspect of the invention, the input device comprises at least one of a mouse which is operable by a user to move a pointer on a screen of the display while the user views the first image corresponding to the received operation control data, and a keyboard which is operable by a user to move a cursor on a screen of the display while the user views the first image corresponding to the received operation control data.

According to another feature of the fourth aspect of the invention, the data processing apparatus comprises a personal computer providing the connector, the receiver, the display, the input device, and the transmitter.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 5 is an operation sequence according to which sets of operation control data stored in the FAX of FIG. 1 are sent to the PC of FIG. 1, so that a user may change one or more of the sets of operation control data represented by images contained in the first image pattern while viewing the images on the display of the PC;

FIG. 6 is an operation sequence according to which the sets of operation control data stored in the FAX of FIG. 1 are replaced by the sets of operation control data changed on the PC of FIG. 1 by the user;

FIG. 7A is an illustrative view of a set of operation control data stored in a first memory area of a buffer memory of the FAX of FIG. 1;

FIG. 7B is an illustrative view of a set of operation control data stored in each of a plurality of memory areas of an EEPROM of the FAX of FIG. 1;

DETAILED DESCRIPTION OF THE PREFERRED EMBODIMENTS

Figure 1:
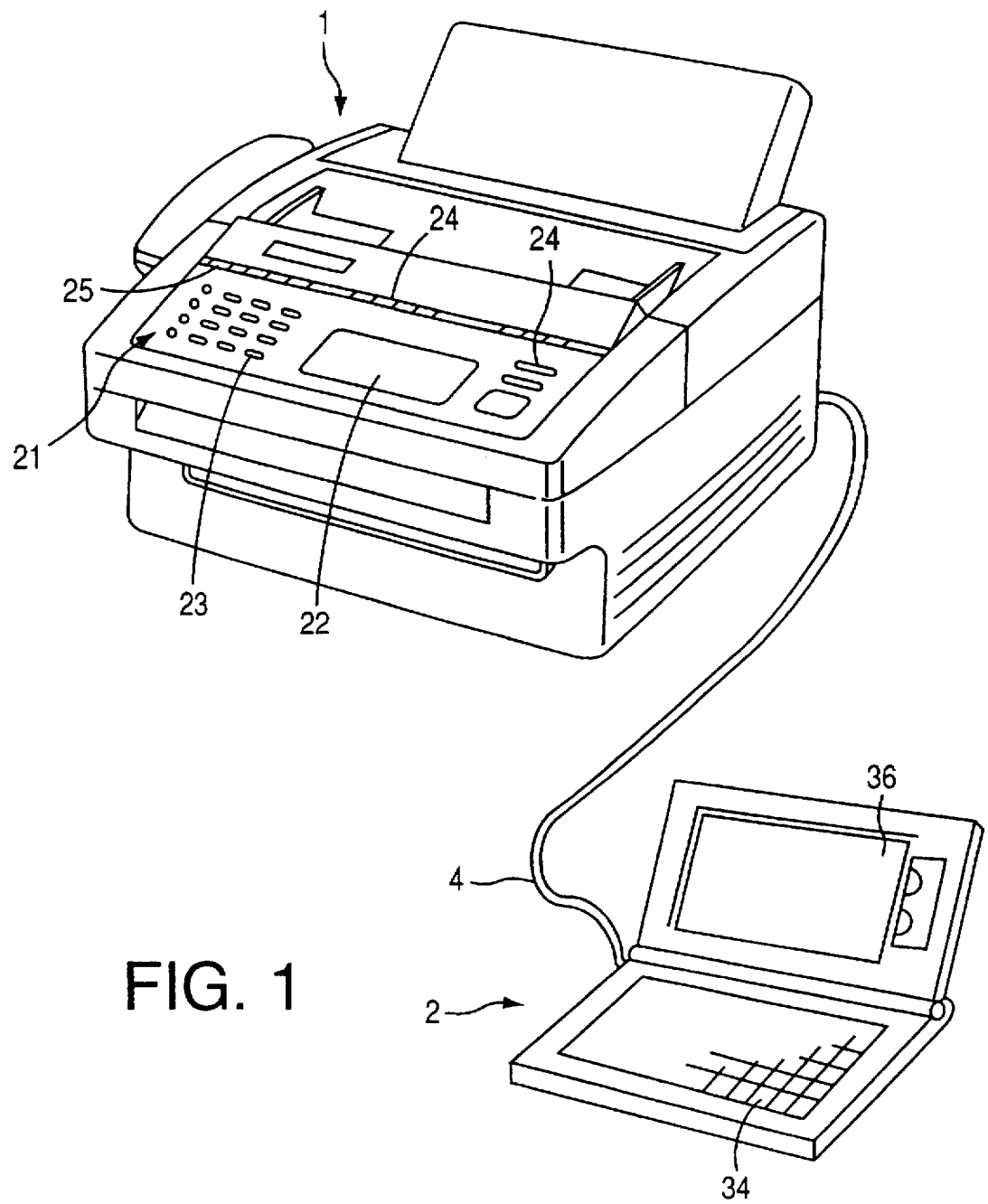
FIG. 1 is a perspective view of a facsimile apparatus (FAX) and a personal computer (PC) to which the present invention is applied.

Referring to FIG. 1, there is shown a facsimile system including a facsimile apparatus 1 (hereinafter, abbreviated to the "FAX") and a personal computer 2 (hereinafter, abbreviated to the "PC") to which the present invention is applied. The FAX 1, which will be referred to as a calling station, if appropriate, is connectable to the PC 2 via a first terminal (not shown) as a first connector of the FAX 1, a cable 4, and a second terminal (not shown) as a second connector of the PC 2. The FAX 1 includes an input and output (I/O) port 3 connected to the first terminal.

Figure 2:
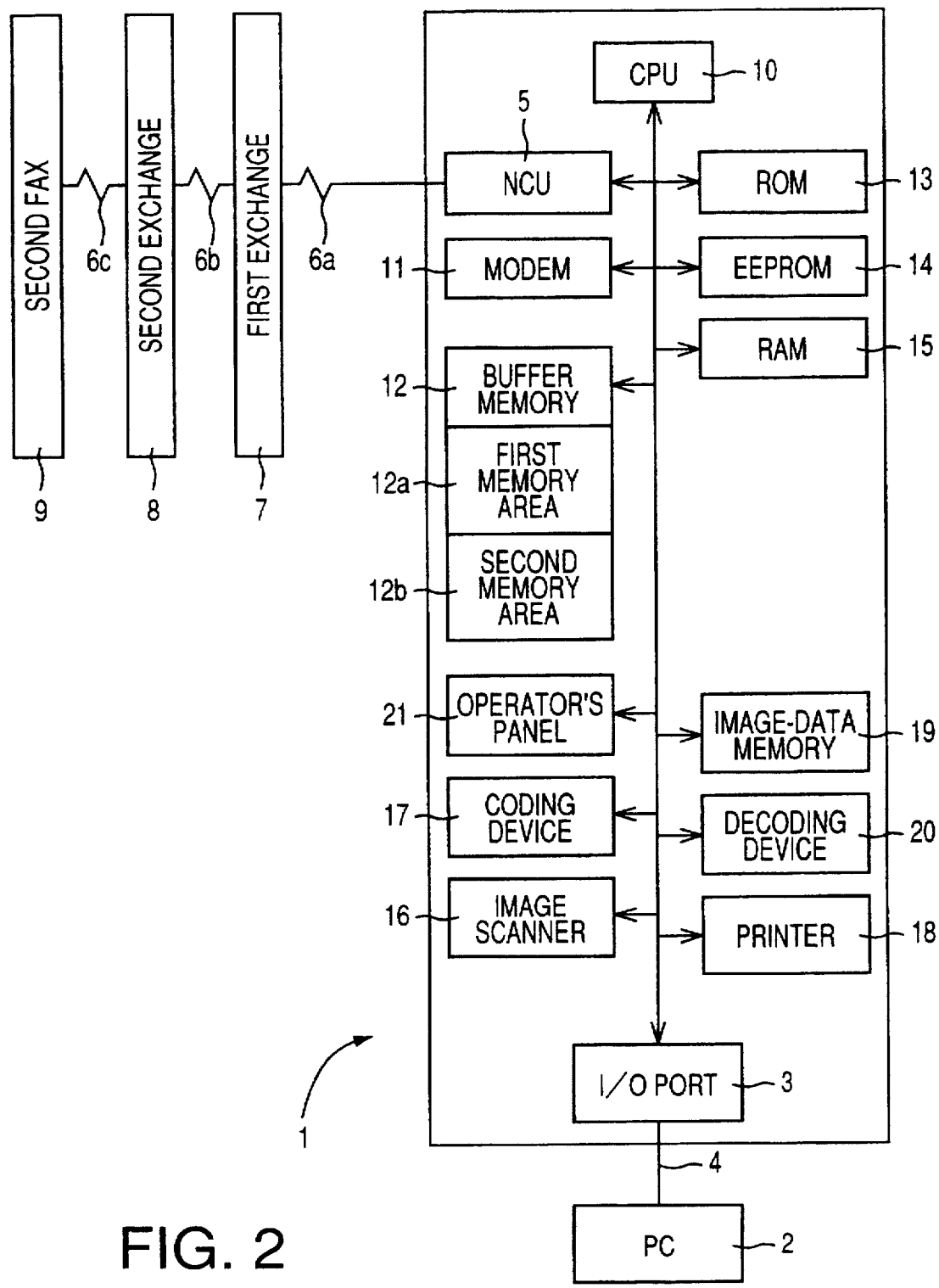
FIG. 2 is a diagrammatic view of various elements of the FAX of FIG. 1.

As shown in FIG. 2, the FAX 1 as the calling station is connected via a network control unit (NCU) 5 to a first external line 6a, such as a telephone line, which in turn is connected to a facsimile apparatus 9 as a called station via a first exchange 7 on the side of the calling station 1, a second external line 6b such as a telephone line, a second exchange 8 on the side of the called station 9, and a third external line 6c such as a telephone line.

The FAX 1 includes a central processing unit (CPU) 10 which is connected via signal bus line to each of other elements of the FAX 1 which will be described below. The CPU 10 controls each element of the FAX 1 according to predetermined communication control procedures, so that the FAX 1 may function as a facsimile machine, i.e., carry out data communications with other facsimile machines including the FAX 9.

The FAX 1 includes a modem 11 which modulates image data in the form of digital signals, into analog signals, so that the analog image data are output to the first external line 6a via the NCU 5. In addition, the modem 11 demodulates image data in the form of analog signals received from the first external line 6a via the NCU 5, into digital signals. Moreover, the modem 11 sends and receives various signals needed to control the data communications.

A buffer memory 12 of the FAX 1 includes a first memory area 12a for temporarily storing various sorts of data including coded image data to be sent to the FAX 9 and temporarily storing, as described later, sets of operation control data including data indicative of a facsimile number of the FAX 9 as the called station and data indicative of a name of a user of the FAX 9. The buffer memory 12 also includes a second memory area 12b for temporarily storing sets of operation control data including data indicative of a name of a user of the FAX 1 as the calling station, data indicative of a need to output an operation summary report, data indicative of a need to output a communication success/error report, data indicative of a volume of a ring of the FAX 1, data indicative of a volume of a speaker of the FAX 1, etc.

The FAX 1 includes a read only memory (ROM) 13 in which control programs are stored, and an electrically erasable and programmable ROM (EEPROM) 14 as a non-volatile memory which stores sets of operation control data including data indicative of the facsimile number (i.e., dialing number) of the FAX 9, data indicative of the user's name of the FAX 9, data indicative of the user's name of the FAX 1, data indicative of a need to output an operation summary report, data indicative of a need to output a communication success/error report, data indicative of a ring volume of the FAX 1, data indicative of a speaker volume of the FAX 1, etc. The EEPROM 14 can maintain the sets of operation control data stored therein even when the FAX 1 is disconnected from an electric power source.

The FAX 1 further includes a random access memory (RAM) 15 which temporarily stores various sorts of data produced during the operation of the FAX 1. An image scanner 16 of the FAX 1 reads original images from an original or originals, and produces image data representing the original images. The image data thus produced are coded into coded image data, by a coding device 17. After temporarily being stored in the buffer memory 12, the coded image data are sent out via the NCU 5. The redundancy of facsimile signals or data is compressed by the Modified READ (Relative Element Address Designate) method wherein the signals are coded based on the statistical natures of run lengths of "white" and "black" picture-element data.

A printer 18 of the FAX 1 records images corresponding to received image data, on a recording sheet, thereby providing a hard copy. The printer 18 may be of an electro-photographic type wherein a laser beam is used to form electrostatic latent images on a photoconductive drum, the latent images are developed with a toner, and the images developed are transferred onto a recording sheet and then fixed thereon, or of a thermal-recording type wherein a thermal head is used to thermally form images on a heat-sensitive sheet. An image-data memory 19 stores received image data, and dot data which are sent to the printer 18 for the image recording. The image-data memory 19 may be provided by a dynamic RAM (DRAM).

In the case where the FAX 1 receives image data or information from the FAX 9 and records images on a real-time basis, the two FAXes 1, 9, before sending and receiving the image data, send and receive various signals to and from each other according to predetermined communication control procedures. The image data received is temporarily stored in the buffer memory 12. The "compressed" image data are decoded (i.e., "extended") by a decoding device 20, and are processed into pages of dot data which in turn are stored in a dot-data memory area of the image-data memory 19. The dot data stored in the memory 19 are processed based on a predetermined degree of resolution, and the dot data processed are sent to the printer 18 so that images corresponding to the dot data may be recorded or printed on each of recording sheets.

In the case where the FAX 1 receives image data when no recording sheet is left in a sheet cassette thereof, that is, in the case of "in-emergency data reception", the CPU 10 automatically operates for temporarily storing the image data in the form of the compressed data, in the image-data memory 19. In this case, after new recording sheets are supplied to the sheet cassette, the CPU 10 operates for processing the image data into dot data based on the predetermined degree of resolution, and storing the dot data in another dot-data memory area of the image-data memory 10.

In the case where the FAX 1 sends image data to the FAX 9 on a real-time basis, that is, in the case of "direct data transmission", the image scanner 16 reads original images from originals, and produces image data indicative of the original images. The image data are coded by the coding device 17, and the coded image data are sent to the FAX 9.

In the case where the FAX 1 stores image data in the image-data memory 19 after the image scanner 16 reads original images and the coding device 17 codes the image data representing the original images, that is, in the case of "memory-using data transmission", the CPU 10 subsequently operates for automatically sending the image data, or operates for automatically sending the image data at a designated time. The designated-time memory-using data transmission function of the FAX 1 may be utilized when there is a time difference between two places where the FAXes 1, 9 are disposed, or when same original images or same image data are sent to a plurality of facsimile machines as called stations. Since image data which are input through the PC 2 are coded data, the coded data are temporarily stored in the image-data memory 19 of the FAX 1 as the calling station and then are sent to the FAX 9 as the called station.

The FAX 1 additionally has an operator's panel 21 which is manually operable by the user. The panel 21 includes a 16-digit liquid crystal display (LCD) 22, numeral keys 23, function keys 24, one-touch-dialing-number-related-data input key 25, etc. The LCD 22 displays images indicative of current operating states of the FAX 1. The keys 23, 24, 25 are operable by the user for carrying out various operations on the FAX 1. A set of one-touch-dialing-number-related data are registered on the FAX 1, by inputting a one- or two-digit number (e.g., from 1 to 24) and a facsimile number and/or a user's name of a called station, through operation of appropriate ones of the numeral keys 23 and the function keys 24, and finally operating the one-touch-dialing-number-related data input key 25.

Figure 3:
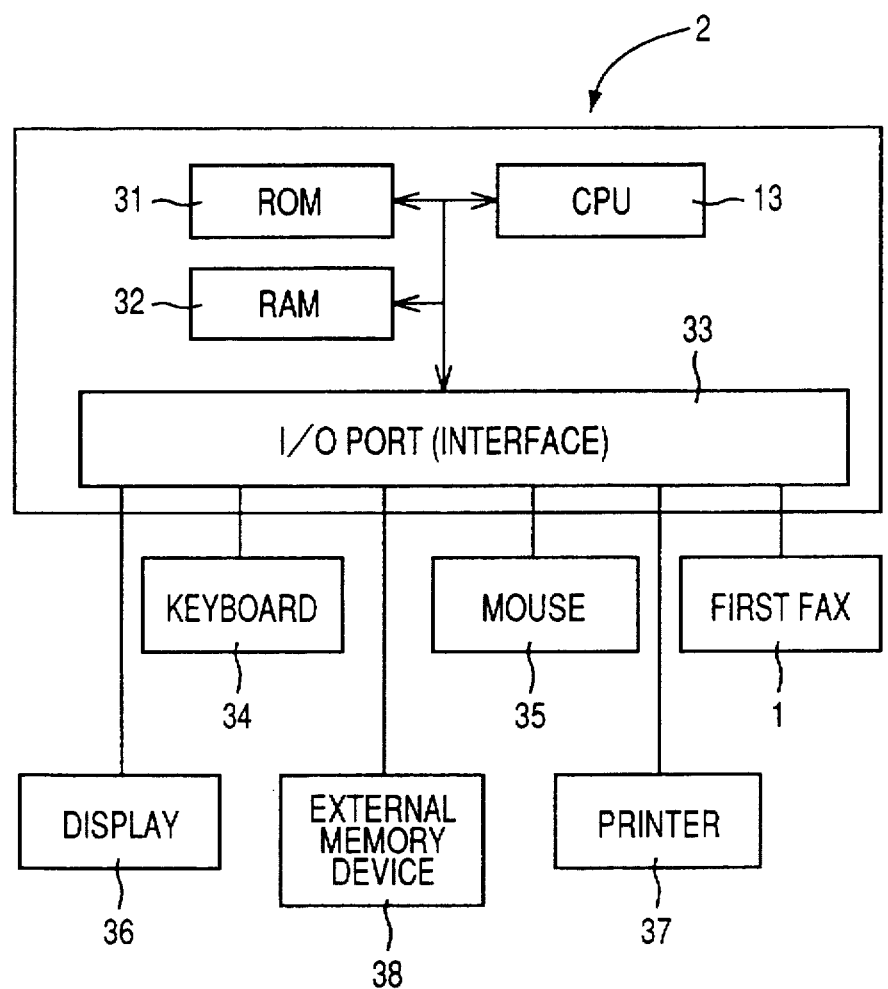
FIG. 3 is a diagrammatic view of various elements of the PC of FIG. 1.

As shown in FIG. 3, the PC 2 includes a CPU 30, a ROM 31 in which control programs are stored, a RAM 32 in which various sorts of data are temporarily stored, and an input and output (I/O) port (i.e., interface) 33. The PC 2 additionally includes an input device provided by a keyboard 34 and a mouse 35, an output device provided by an LCD 36 and a printer 37, and an external memory device 38 such as a hard disc. Thus, the FAX 1 is connected as an input and output device to the PC 2.

Next, there will be described the operation of the PC 2 for inputting a set of one-touch-dialing-number-related data into the FAX 2. First, the PC 2 is logged on, and an application software corresponding to this operation is started. Thus, the LCD 36 of the PC 2 displays an image pattern 40 corresponding to the one-touch-dialing-number-related or speed-dialing-number-related data inputting operation. The image pattern 40 includes a one-touch-dialing-number window 41 showing one-touch-dialing numbers from 1 to 24, and an active window 42 which is superimposed on the window 41 and through which a new set of one-touch-dialing-number-related data is input by the user.

Subsequently, the PC 2 requests the FAX 1 to read and send, from the EEPROM 14, a set of one-touch-dialing-number-related data including data indicative of a facsimile number of a called station and/or data indicative of a user's name of the called station. In the current state, since the first one-touch-dialing number, "1", is associated with a facsimile number of a called station and a user's name of the called station, stored in the EEPROM 14, the number "1" is indicated at a black circle as shown in the window 41 in FIG. 4. In the case where the PC 2 is operated to request the FAX 1 to send the facsimile number and/or user's name stored in association with the number "1", the mouse 35 is used to designate and click the number "1" in the one-touch-dialing-number window 41, so that the active window 42 including a first item ("user's name") 43 and a second item ("facsimile number (dialing or telephone number)") 44 may open.

Next, the mouse 35 is used to designate and click the facsimile-number item 44 and subsequently click a second icon 41b. Then, as indicated in the registered-data reporting sequence shown in FIG. 5, the PC 2 sends a command signal, CMD1=0,01?, to the FAX 1. In response thereto, the FAX 1 sends the facsimile number stored in association with the one-touch-dialing number "1", e.g., "1111" CR ('CR' is a carriage return signal), to the PC 2, so that the facsimile number "1111" may be displayed in the facsimile-number item 44. In addition, the mouse 35 is used to click the user's name item 43 and subsequently click the second icon 41b. Then, the PC 2 sends a command signal, CMD2=0,01?, to the FAX 1. In response thereto, the FAX 1 sends the user's name stored in association with the number "1", e.g., "NAGOYA" CR, to the PC 2, so that the user's name "NAGOYA" may be displayed in the user's name item 43.

In the case where the user wishes to change the facsimile number stored or registered in association with the one-touch-dialing number "1" in the FAX 1, the mouse 35 is used to click the facsimile-number item 44 of the active window 42 in the image pattern 40 displayed on the LCD 36 of the PC 2, and the keyboard 34 is used to move a cursor to the first figure of the facsimile number "1111" and input the four numbers, "1212". After the user confirms that the input new facsimile number is correct, the mouse 35 is used to click a symbol, "OK", in the active window 42. Then, data indicative of the input new facsimile number, i.e., the changed facsimile number are temporarily stored in the RAM 32 of the PC 2. Subsequently, when the mouse 35 is used to click a first icon 41a, the PC 2 sends the changed facsimile number to the FAX 1.

The PC 2 and the FAX 1 carries out the above-described operations as indicated in the one-touch-dialing-number-related data registering sequence shown in FIG. 6. In the present embodiment, the PC 2 is used to input a new set of operation control data (e.g., facsimile number or user's name) relating to each of various operations of the FAX 1, so that the input data are sent from the PC 2 to the FAX 1. For example, when the PC 2 commands the FAX 1 to register the changed facsimile number "1212" in association with the one-touch-dialing number "1", the FAX 1 registers the changed facsimile number in place of the previous facsimile number and sends to the PC 2 an answer, "OK" CR, indicating that the changed facsimile number has been registered. Subsequently, when the PC 2 commands the FAX 1 to register the user's name "NAGOYA" in association with the one-touch-dialing number "1", the FAX 1 registers the user's name and sends to the PC 2 an answer, "OK" CR, indicating that the user's name has been registered.

According to the sequence shown in FIG. 6, a combination of the changed facsimile number "1212" and the user's name "NAGOYA" are stored in association with the one-touch-dialing number "1", in the FAX 1.

In the sequences shown in FIGS. 5 and 6, the symbol, CMD1, is indicative of a command to designate a facsimile number of a called station, and the symbol, CMD2, is indicative of a command to designate a user's name of a called station. When the designating command, CMD1 or CMD2, is sent from the PC 2 to the FAX 1, the designating command serves as a registering command to register a new set of operation control data in place of a prior set of data. The first number, "0", of each command indicates that the following number is a one-touch-dialing number. In the present example, the one-touch-dialing number of each command is "01".

When the FAX 1 receives, from the PC 2, the CR signal as transmission control characters or data, following the command, CMD1=0,01,"1212", the FAX 1 stores "1" indicative of the sort of received command, "01" indicative of the one-touch-dialing number, and "1212" indicative of the facsimile number, separately, in a first, a second, and a third memory section, RAM1, RAM2, RAM3, of the first memory area 12a of the buffer memory 12, respectively.

Similarly, when the FAX 1 receives the CR signal following the command, CMD2=0,01,"NAGOYA", the FAX 1 stores "2" indicative of the sort of received command, "01" indicative of the one-touch-dialing number, and "NAGOYA" indicative of the user's name, separately, in the first, second, and third memory sections RAM1, RAM2, RAM3 of the first memory area 12a, respectively.

The PC 2 sends, to the FAX 1, the above-described control characters or data that are coded according to ASKII (American National Standard Code for Information Interchange). The ASKII control data are temporarily stored in the first memory area 12a, as shown in FIG. 7A, and subsequently the facsimile number "1212" or the user's name "NAGOYA" is stored in an appropriate area of the EEPROM 14, as shown in FIG. 7B.

Figure 8:
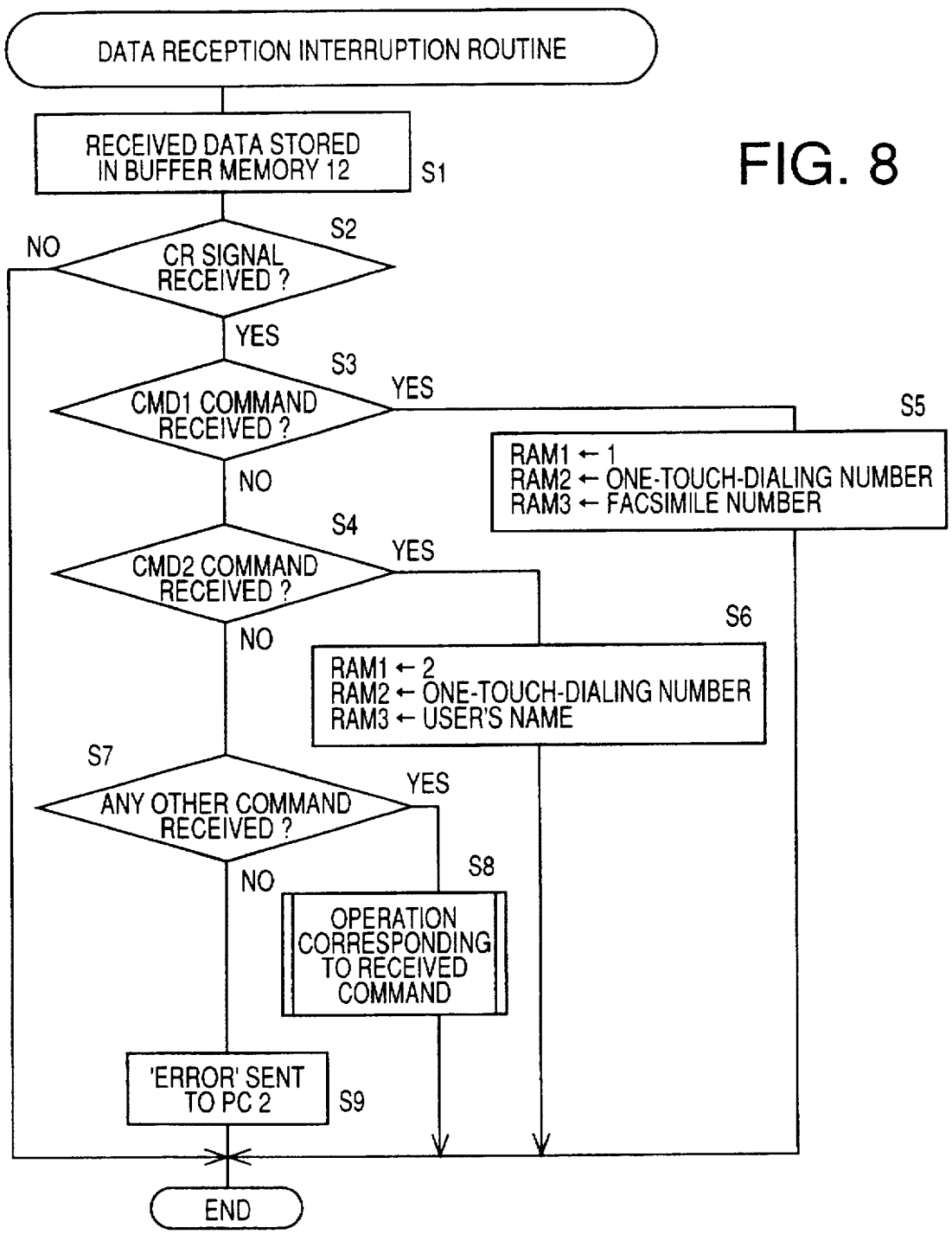
FIG. 8 is a flow chart representing a control program according to which the FAX of FIG. 1 identifies and stores a set of operation control data received from the PC of FIG. 1.

FIG. 8 shows a flow chart representing a control program or routine according to which the FAX 1 identifies and stores a command signal (i.e., control data) received from the PC 2. Each time the FAX 1 receives one byte of control data from the PC 2, the CPU 10 of the FAX 1 begins the data reception interruption routine represented by the flow chart of FIG. 8.

First, at Step S1, the CPU 10 reads one byte of data received from the PC 2 and stores the data in the first or second memory area 12a, 12b of the buffer memory 12. Step S1 is followed by Step S2 to judge whether the FAX 1 has received a CR signal as transmission control data. If a negative judgment is made at Step S2, the current interruption operation is ended. Accordingly, no data stored in the EEPROM 14 in association with the one-touch-dialing numbers are changed.

On the other hand, if the FAX 1 receives a CR signal at the end of a single command, that is, if a positive judgment is made at Step S2, the control of the CPU 10 proceeds with Steps S3 and S4 to judge which sort of command the FAX 1 has received. If the received command is CMD1, that is, if a positive judgment is made at Step S3, the control of the CPU 10 goes to Step S5 to temporarily store, as described above, "1" indicative of the sort of received command, a one-touch-dialing number (e.g., "01"), and a facsimile number (e.g., "1212"), in the first, second, and third memory sections RAM1, RAM2, RAM3 of the first memory area 12a, respectively. Similarly, if the received command is CMD2, that is, if a positive judgment is made at Step S4, the control of the CPU 10 goes to Step S6 to temporarily store "2" indicative of the sort of received command, a one-touch-dialing number (e.g., "01"), and a series of characters indicative of a user's name (e.g., "NAGOYA"), in the first, second, and third memory sections RAM1, RAM2, RAM3 of the first memory area 12a, respectively.

If a negative judgment is made at each of Steps S3 and S4, the control of the CPU 10 goes to Step S7 to judge whether the FAX 1 has received a command of a sort other than the one-touch-dialing-related-data changing commands CMD1, CMD2. If a positive judgment is made at Step S7, the control of the CPU 10 goes to Step S8 to carry out an operation corresponding to the sort of received command. On the other hand, if a negative judgment is made at Step S7, the CPU 10 recognizes a data reception failure and the control goes to Step S9 to send a signal, ERROR CR, to the PC 2, so that a message indicative of the error is displayed on the LCD 36 of the PC 2. In response thereto, the operator or user may input the same command in the PC 2, again.

Figure 9:
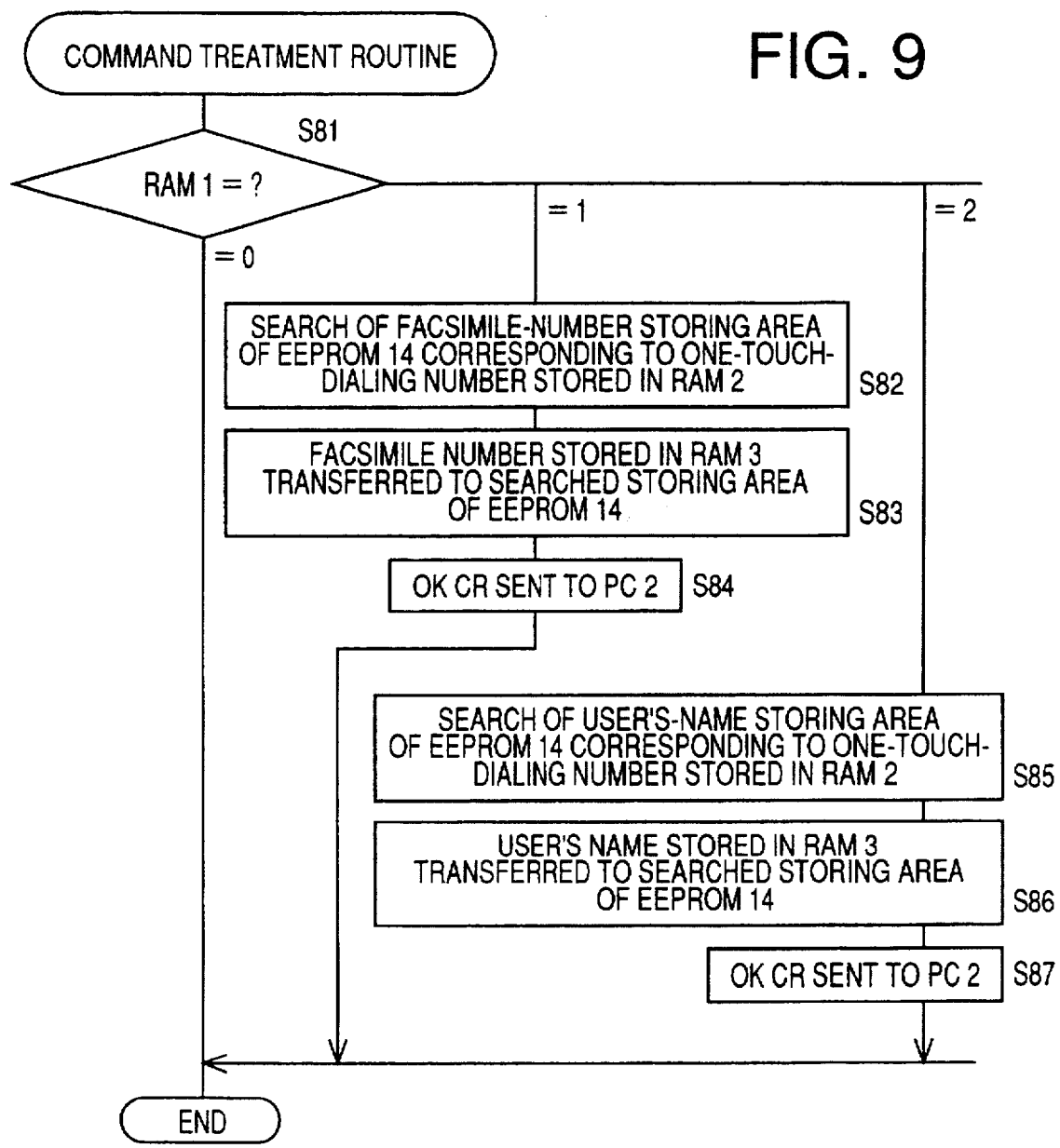
FIG. 9 is a flow chart representing a control program according to which the FAX of FIG. 1 treats the received set of operation control data.

FIG. 9 shows a flow chart representing a control program according to which the FAX 1 treats a received command. First, at Step S81, the CPU 10 of the FAX 1 judges which sort of command the FAX 1 has received, based on the data (e.g., "1" or "2") temporarily stored in the first memory section RAM1 of the first memory area 12a of the buffer memory 12. In the case where the data stored in the memory section RAM1 is "0" indicating that there is no received command, the current command treatment routine is ended.

In the case where the data stored in the memory RAM1 is "1" indicative of the facsimile-number changing command CMD1, the control of the CPU 10 goes to Step S82 to find, in the EEPROM 14, a prescribed facsimile-number storing area corresponding to the one-touch-dialing number stored in the second memory section RAM2. Step S82 is followed by Step S83 to store the facsimile number stored in the third memory section RAM3, in the prescribed facsimile-number storing area of the EEPROM 14. Step S83 is followed by Step S84 to send a signal, OK CR, to the PC 2.

Similarly, in the case where the data stored in the memory RAM1 is "2" indicative of the user's name changing command CMD2, the control of the CPU 10 goes to Step S85 to find, in the EEPROM 14, a prescribed user's-name storing area corresponding to the one-touch-dialing number stored in the second memory section RAM2. Step S85 is followed by Step S86 to store the characters of user's name stored in the third memory section RAM3, in the prescribed user's-name storing area of the EEPROM 14. Step S86 is followed by Step S87 to send a signal, OK CR, to the PC 2.

Thus, in the present embodiment, a facsimile number and/or a user's name associated with each of the one-touch-dialing numbers from 1 to 24 can be changed irrespective of whether the other sets of operation control data are changed.

The FAX 1 treats the other sorts of received commands according to predetermined procedures. Those command treatments are carried out while the FAX 1 operates in a steady state.

Figure 4:
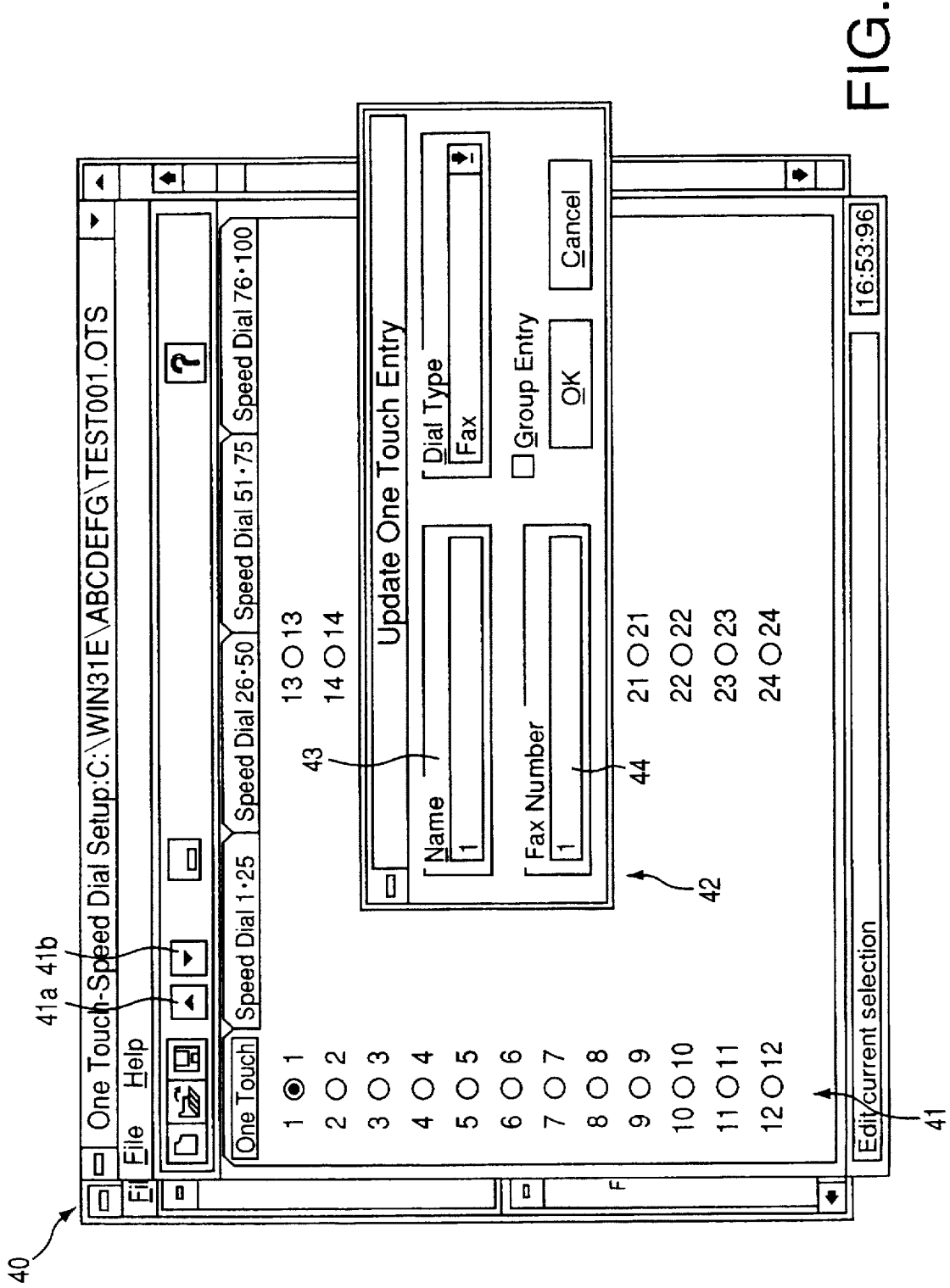
FIG. 4 is a view of a first image pattern which is displayed on a display device of the PC of FIG. 1.
Figure 10:
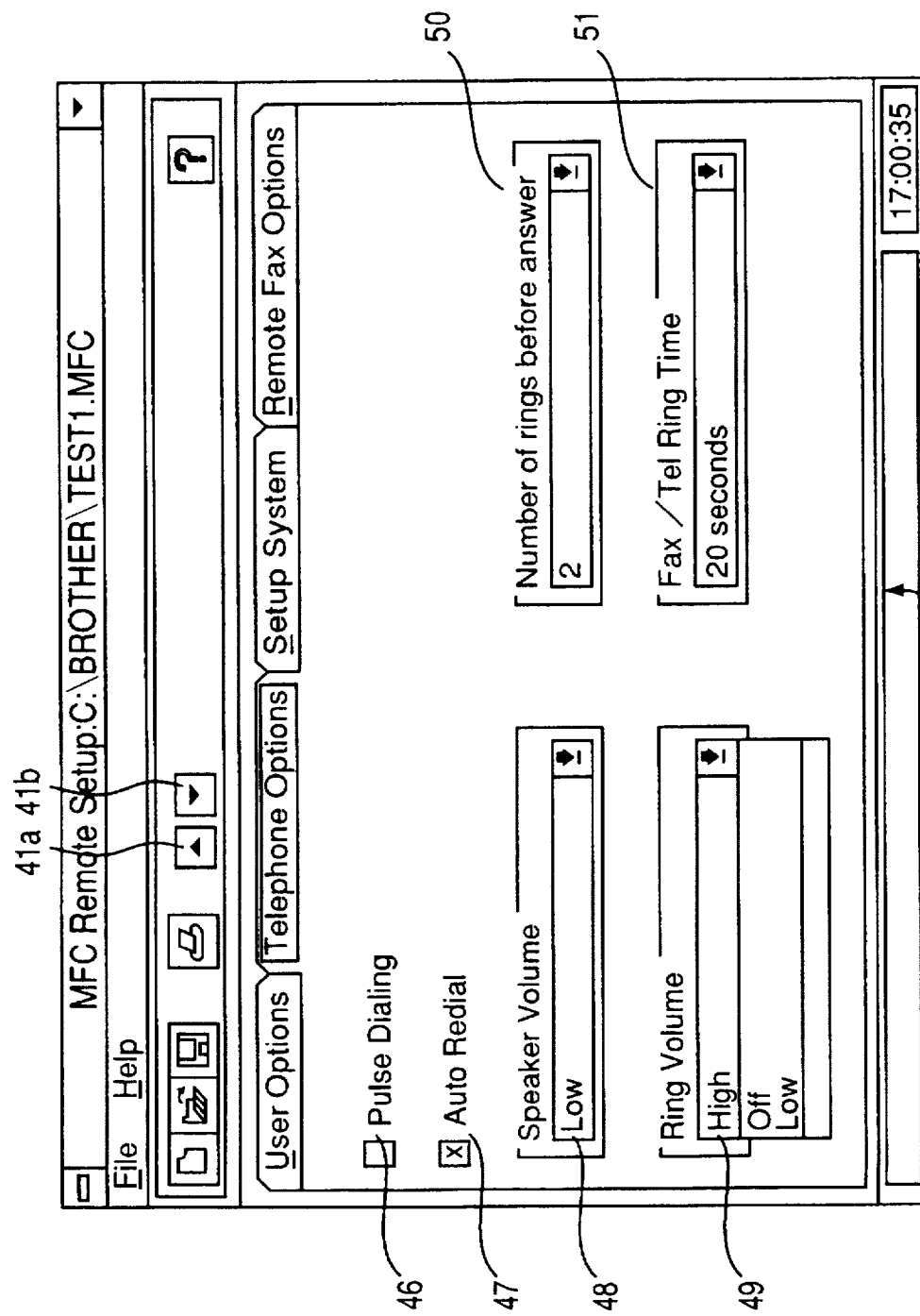
FIG. 10 is a view corresponding to FIG. 4, showing a second image pattern which is displayed on the display device of the PC of FIG. 1.

FIG. 10 shows another image pattern 45 which may be displayed on the LCD 36 of the PC 2 and selectively be changed to and from the first image pattern 40 of FIG. 4, by using the mouse 35. The user can input or change data, such as values or information, related to other sorts of operations of the FAX 1, on the second image pattern 45 of the PC2. The image pattern 45 includes various data items 46, 47, 48, 49, 50, 51. More specifically described, in the image pattern 45 shown in FIG. 10, a "Pulse Dialing" function 46 is not selected, which means that this function is "OFF"; an "Auto Redial" function 47 is selected, which means that this function is "ON"; a "Speaker Volume" item 48 is selected at a "LOW" level; a "Ring Volume" item 49 is selected at a "High" level; a "Number of rings before answer" item 50 is selected at 2 times; and a "Fax/Tel Ring Time" item 51 is selected at 20 seconds. All data for those functions or operations 46–51 are stored in the EEPROM 14 of the FAX 1.

Figure 11:
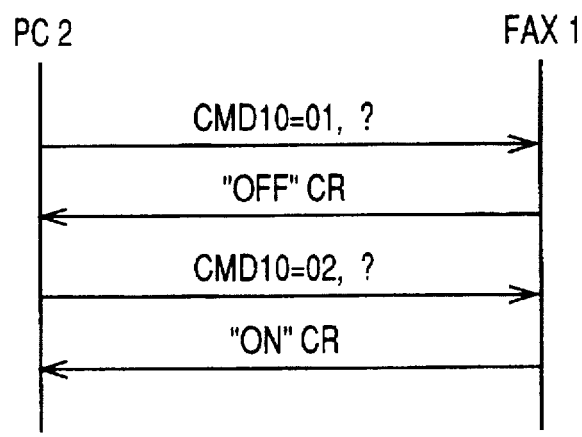
FIG. 11 is a view corresponding to FIG. 5, showing an operation sequence according to which other sets of operation control data stored in the FAX of FIG. 1 are sent to the PC of FIG. 1.

FIG. 11 shows a registered-data reporting sequence according to which the PC 2 requests the FAX 1 to send, thereto, a set of operation control data registered therein. For example, when the user wishes to input or change data related to the "Pulse Dialing" function, the mouse 35 is used to click the "Pulse Dialing" item 46 in the image pattern 45 and subsequently click the second icon 41b. Then, as indicated in the sequence of FIG. 11, the PC 2 sends, to the FAX 1, a pulse-dialing-number-related-data reporting and displaying command, CMD10=01?. In response thereto, the FAX 1 sends an answer, "OFF" CR, to the PC 2, so that no image or symbol is displayed in the "Pulse Dialing" item 46 of the image pattern 45. Also, when the user wishes to input or change data related to the "Auto Redial" function, the mouse 35 is used to click the "Auto Redial" item 47 in the image pattern 45 and subsequently click the second icon 41b. Then, the PC 2 sends, to the FAX 1, an auto-redial-related-data reporting and displaying command, CMD10=02?. In response thereto, the FAX 1 sends an answer, "ON" CR, to the PC 2, so that an image or symbol, "x", is displayed in the "Auto Redial" item 46 of the image pattern 45. Similarly, the PC 2 can be used to request the FAX 1 to read and send, from the EEPROM 14 of the FAX 1, data related to each of the other operation items 48–51.

Figure 12:
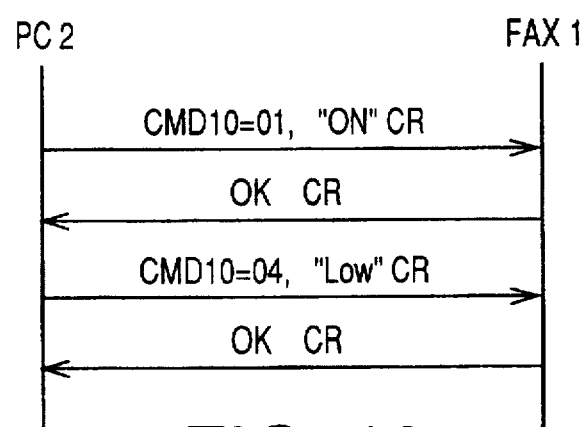
FIG. 12 is a view corresponding to FIG. 6, showing an operation sequence according to which the sets of operation control data stored in the FAX of FIG. 1 are replaced by the sets of operation control data changed on the PC of FIG. 1 by the user.

FIG. 12 shows a data registering sequence according to which the PC 2 commands the FAX 1 to register (input or change) data related to each of the operation items 46–51. For example, when the PC 2 sends a pulse-dialing-number-related-data registering command, CMD10=01, "ON" CR, to the FAX 1, the FAX 1 sends an answer, OK CR, to the PC 2. Also, when the PC 2 sends a ring-volume-related-data registering command, CMD10=04,"LOW" CR, to the FAX 1, the FAX 1 sends an answer, OK CR, to the PC 2. These data treatment operations are carried out according to the same control programs as those represented by the flow charts of FIGS. 8 and 9, and accordingly detailed description thereof is omitted. In these cases, however, the input or changed sets of operation control data are temporarily stored in the second memory area 12b of the buffer memory 12, and subsequently are stored in a different memory area of the EEPROM 14 which area is different from the memory area of the same 14 in which the data (one-touch-dialing numbers from 1 to 24, facsimile numbers, and user's names) related to the one-touch-dialing operation are stored.

Figure 13:
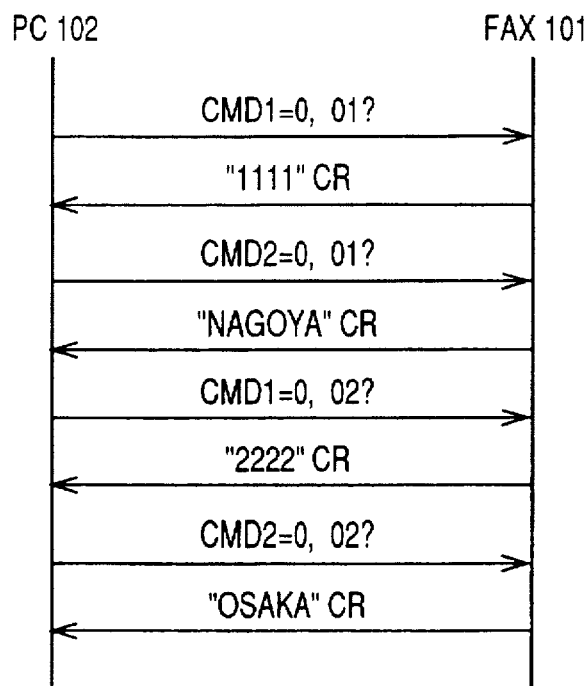
FIG. 13 is a view corresponding to FIG. 5, showing an operation sequence employed in a second embodiment according to which sets of operation control data stored in another FAX are sent to another PC.
Figure 14:
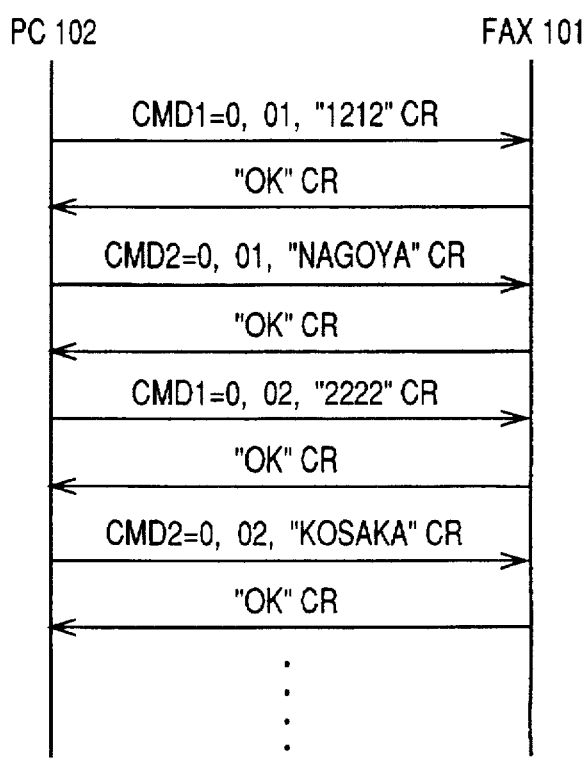
FIG. 14 is a view corresponding to FIG. 6, showing an operation sequence employed in the second embodiment according to which the sets of operation control data stored in the FAX are replaced by the sets of operation control data changed on the PC by the user.

Referring next to FIGS. 13 and 14, there are shown operation sequences according to which a facsimile system including a facsimile machine (FAX) 101 and a personal computer (PC) 102 interchanges sets of operation control data with each other. The FAX 101 and the PC 102 have respective hardware constructions similar to those of the FAX 1 and the PC 2 shown in FIGS. 2 and 3, respectively, and are operated according to different control programs. In the instant, second embodiment in accordance with the present invention, the PC 102 requests the FAX 101 to simultaneously send, to the PC 102, the sets of one-touch-dialing-number-related data registered or stored therein for all the one-touch-dialing numbers from 1 to 24, when the PC 102 is operated to display a one-touch-dialing-number window 41 shown in FIG. 4. In response thereto, the FAX 101 sends the sets of one-touch-dialing-number-related data, to the PC 101, so that the sets of data are stored in a RAM 32 of the PC 101. In addition, when a mouse 35 is used to designate and click the first one-touch dialing number, "1", indicated in the window 41, an active window 42 is opened within the window 41. Based on the sets of data stored in the RAM 32, the active window 42 indicates not only images corresponding to operation or function items, i.e., "Name" 43 and "Fax Number" 44, but also images corresponding to the set of data indicative of registered name and fax number related to the designated number "1", so that the name and/or the fax number may be changed by a user. If no data are registered in the FAX 101 and no data are sent to, or stored in, the PC 102, only the images, "Name" 43 and "Fax Number" 44, of the operation items are displayed, so that a new set of data related to the first one-touch-dialing number, "1", may be input by the user.

In the second embodiment, as shown in FIG. 13, the set of data indicative of a fax number, "1111", and a user's name, "NAGOYA", for the number "1", the set of data indicative of a fax number, "2222", and a user's name, "OSAKA", for the number "2", and so on are stored in the FAX 101, and all the sets of data stored in the FAX 101 are sent in advance to the PC 102 in response to the request of the PC 102, although only the two sets of data are shown in FIG. 13 and the other sets of data are omitted from the figure.

In the second embodiment, as shown in FIG. 14, the registered fax number, "1111", is changed to a new fax number, "1212", for the one-touch-dialing number, "1", and the registered user's name, "OSAKA", for the number "2" is change to a correct user's name, "KOSAKA", but the registered user's name, "NAGOYA", for the number "1" and the registered fax number, "2222", for the number "2" are not changed. When the mouse 35 is used to designate and click a symbol, 'OK', in the active window 42 after the fax number, "1111", for the number, "1", is changed to the fax number, "1212", with the user's name, "NAGOYA", being unchanged, the set of one-touch-dialing-number-related data is temporarily stored in the RAM 32 of the PC 102. Similarly, when the mouse 35 is used to click the symbol, 'OK', in the active window 42 after the user's name, "OSAKA", for the number, "2", is changed to the new name, "KOSAKA", with the fax number, "2222", being unchanged, the set of one-touch-dialing-number-related data is temporarily stored in the RAM 32 of the PC 102. When the one-touch-dialing-number window 41 is closed, all the sets of one-touch-dialing-number-related data are sent from the PC 102 to the FAX 101, although only the two sets of data are shown in FIG. 14 and the other sets of data are omitted from the figure. Thus, the sets of one-touch-dialing-number-related data sent from the PC 102 are stored in place of all the prior sets of data, in an EEPROM 14 of the FAX 101.

Figure 15:
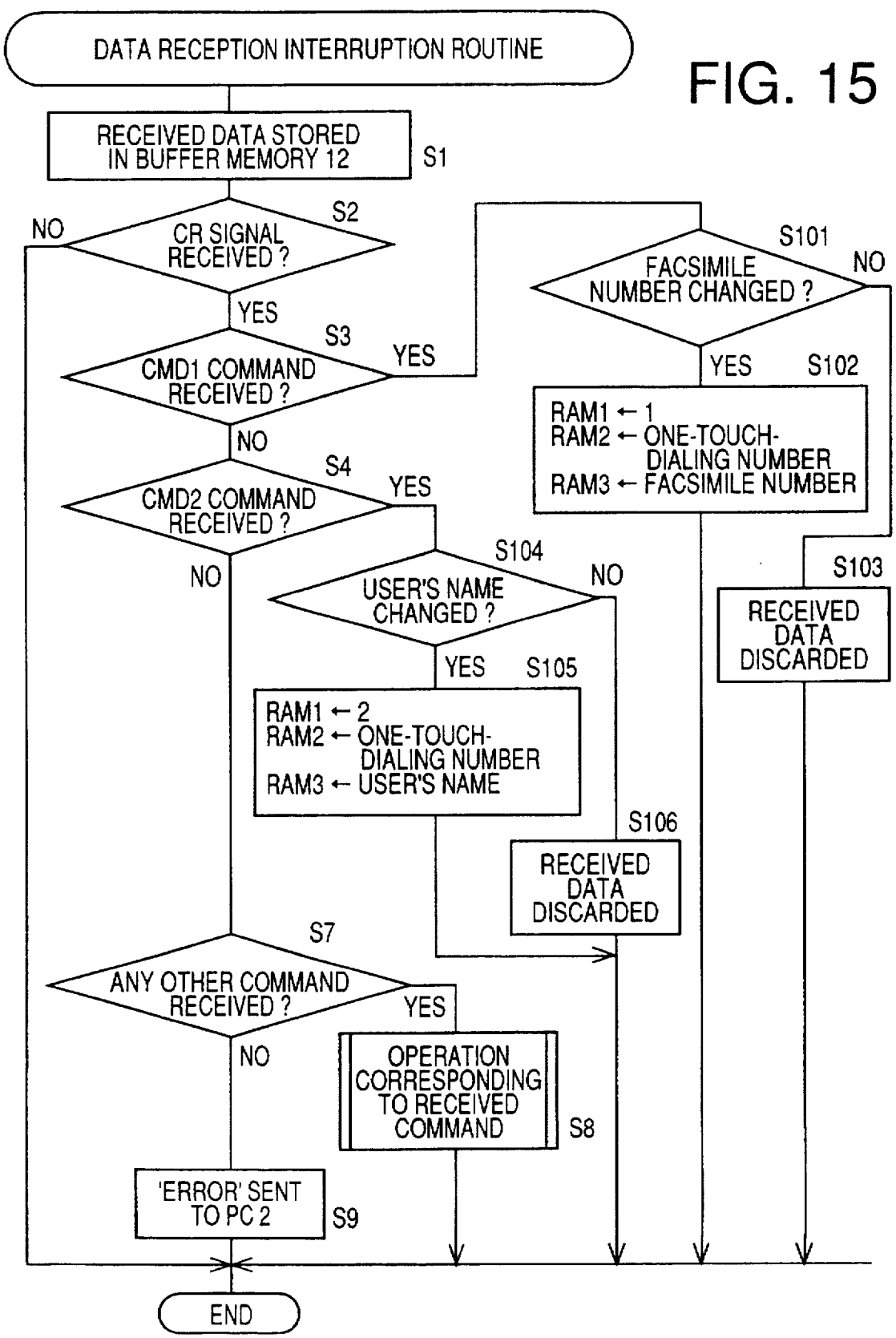
FIG. 15 is a flow chart representing a control program employed in a third embodiment according to which another FAX identifies and stores a set of operation control data received from another PC.

Referring next to FIG. 15, there is shown a flow chart representing a modified control program according to which the FAX 1 identifies a sort of a command sent from the personal computer (PC) 2 and carries out an operation corresponding to the identified command sort. Since the flow chart of FIG. 15 is basically similar to that shown in FIG. 8, the following description only relates to Steps S101, S102, S103, S104, S105, and S106. However, the operations carried out in Steps S102 and S105 are the same as those carried out in Steps S102 and S105, respectively.

At Step S101, the CPU 10 of the FAX 1 judges whether received data indicative of a facsimile number have been changed by the PC 2, by comparing the received facsimile number with the original or prior facsimile number stored in the EEPROM 14. Alternatively, in the case where the CPU 30 of the PC 2 identifies whether the input device including the keyboard 34 and the mouse 35 has been operated to input data to change data indicative of a facsimile number and add data indicative of the identified change to the data indicative of the changed facsimile number, the CPU 10 of the FAX 1 may judge whether received data indicative of a facsimile number include added data indicative of an identified change. If a positive judgment is made at Step S101, the control of the CPU 10 goes to Step S102, and on the other hand if a negative judgment is made, the control goes to Step S103 to discard the received data.

Similarly, at Step S104, the CPU 10 of the FAX 1 judges whether received data indicative of a user's name have been changed by the PC 2, by comparing the received user's name with the prior user's name stored in the EEPROM 14. If a positive judgment is made at Step S104, the control of the CPU 10 goes to Step S105, and on the other hand if a negative judgment is made, the control goes to Step S106 to discard the received data.

Figure 16:
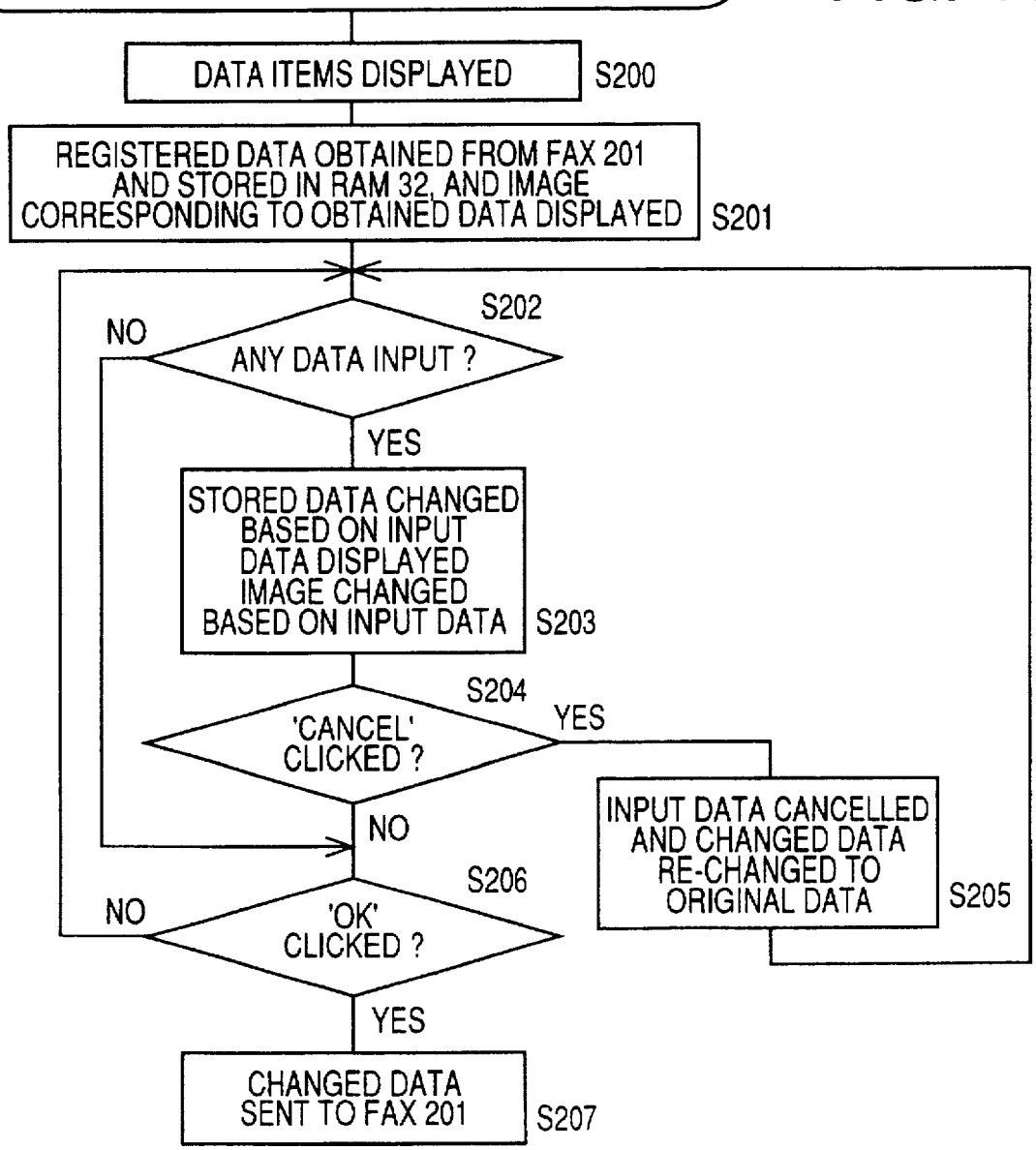
FIG. 16 is a flow chart representing a control program employed in a fourth embodiment according to which another PC identifies a changed set of operation control data and sends the data to another FAX.

Although in the second embodiment all the sets of one-touch-dialing-number-related data which may include one or more unchanged sets of data are sent from the PC 102 to the FAX 101 when the one-touch-dialing-number window 41 is closed on the display 36 of the PC 102, it is possible that the PC 101 be operated according to a control program represented by a flow chart shown in FIG. 16, so as to judge whether each set of operation control data has been changed by a user by operating an input device including a keyboard 34 and a mouse 35 thereof and send only one or more changed sets of operation control data to the FAX 101.

At Step S200, a CPU 30 of the PC 102 controls a display 36 to indicate a one-touch-dialing-number window 41 including one-touch-dialing numbers from 1 to 24 shown in FIG. 4. Step S200 is followed by Step S201 to obtain each set of one-touch-dialing-number-related data from the FAX 101, and store the obtained set of data in the RAM 32. In addition, the CPU 30 controls the display 36 to indicate, in the active window 42, images (e.g., "NAGOYA" and "1111") corresponding to the stored set of data (e.g., for the selected one-touch-dialing number "1"). Step S201 is followed by Step S202 to judge whether any data has been input to change the set of data, by using the input device 34, 35. If a positive judgment is made at Step S202, the control of the CPU 30 goes to Step S203 to change the stored data based on the input data and change the displayed image or images based on the changed data.

Step S203 is followed by Step S204 to judge whether the input data is canceled, by judging whether a symbol, 'CANCEL', in the active window 42 has been clicked with the mouse 35. If a positive judgment is made at Step S204, the control of the CPU 30 goes to Step S205 to cancel the input data and re-change the changed data to the original data, i.e., the data as received from the FAX 101. Then, the control goes back to Step S202.

If a negative judgment is made at Step S202 or S204, the control of the CPU 30 goes to Step S206 to judge whether a symbol, 'OK', in the active window 42 has been clicked with the mouse 35. If a positive judgment is made at Step S206, the control of the CPU 30 goes to Step S207 to transmit only the changed set of one-touch-dialing-number-related data to the FAX 201.

While the present invention has been described in its preferred embodiments, it is to be understood that the present invention may be embodied with various changes, improvements, and modifications that may occur to those skilled in the art without departing from the spirit and scope of the invention defined in the appended claims.

What is claimed is:

1. A facsimile system comprising:

a facsimile machine including a data memory which stores at least one set of operation control data needed to control at least one operation of said facsimile machine; and an external data processing device which is connectable to said facsimile machine and which is operable to change said operation control data and send the changed operation control data to said facsimile machine, wherein said facsimile machine comprises a first transmitter which transmits said operation control data stored in said data memory, to said data processing device, and wherein said data processing device comprises a receiver which receives said operation control data transmitted from said facsimile machine, a display which displays an image corresponding to the received operation control data, an input device which is operable for inputting data to change said received operation control data, judging means for judging whether said input device has been operated for said received operation control data, and a second transmitter which transmits the changed operation data to said facsimile machine so that said changed operation control data are stored in said data memory of the facsimile machine, when said judging means judges that said input device has been operated, and does not transmit said operation control data to said facsimile machine when said judging means judges that said input device has not been operated.

2. A facsimile system according to claim 1, wherein said data processing device comprises a personal computer.

3. A facsimile system according to claim 1, wherein said facsimile machine comprises a first display and said data processing device comprises a second display having a screen area larger than that of said first display of the facsimile machine.

4. A facsimile machine comprising:
- a connector which is adapted to be connected to an external data processing device;
- a data memory which stores at least one set of operation control data needed to control at least one operation of the facsimile machine;
- a transmitter which reads said operation control data from said data memory and transmits the operation control data to the data processing device via said connector; and
- a receiver which receives changed operation control data changed by, and sent from, the data processing device and stores the changed operation control data in said data memory, wherein said data memory stores each of a plurality of sets of operation control data needed to control a corresponding one of a plurality of operations of the facsimile machine, said transmitter reads said sets of operation control data from said data memory and transmits the sets of operation control data to the data processing device, so that the user operates the data processing device to change at least one of the sets of operation control data and send, to the facsimile machine, the sets of operation control data including the changed set of operation control data, and said receiver receives, from the data processing device, the sets of operation control data including said changed set of operation control data and stores the changed set of operation control data in said data memory, and wherein said receiver comprises judging means for judging whether each of said sets of operation control data received from the data processing device, is a changed set of operation control data, and storing means for storing, in said data memory, said each set of operation control data judged to be said changed set of operation control data, and discarding said each set of operation control data judged to be not said changed set of operation control data.

5. A facsimile machine according to claim 4, wherein said connector comprises an input and output (I/O) port which is connectable to a personal computer as the external data processing device.

6. A facsimile machine according to claim 4, wherein said receiver comprises a buffer memory which temporarily stores said changed operation control data, and said data memory comprises a non-volatile memory which maintains said operation control data after the facsimile machine is disconnected from an electric power source.

7. A facsimile machine according to claim 4, wherein said judging means comprises means for judging whether said each set of operation control data received from the data processing device is said changed set of operation control data, by comparing said each set of operation control data with a corresponding one of the sets of operation control data currently stored in said data memory.

8. A facsimile machine according to claim 4, wherein said data memory comprises a plurality of memory areas each of which stores a corresponding one of said plurality of sets of operation control data, and wherein said receiver stores, when receiving said changed sets of operation control data from the data processing device, each of the changed sets of operation control data in a corresponding one of said memory areas of said data memory.

9. A facsimile machine according to claim 4, wherein said data memory comprises a memory device which stores said operation control data comprising designating-operation control data needed to designate a called station.

10. A facsimile machine according to claim 9, wherein said memory device stores, as said designating-operation control data, (a) data indicative of a dialing number of said called station, and (b) data indicative of a user's name of said called station.

11. A facsimile machine according to claim 4, wherein said data memory comprises a memory device which stores said operation control data comprising calling-operation control data commonly needed to call each of a plurality of different called stations.

12. A facsimile machine according to claim 11, wherein said memory device stores said calling-operation control data selected from the group consisting of (a) data indicative of whether a pulse-dialing mode is selected, and (b) data indicative of whether an auto-redialing mode is selected.

13. A facsimile machine according to claim 4, wherein said data memory comprises a memory device which stores said operation control data comprising data needed to operate the facsimile machine when the facsimile machine is called by a calling station.

14. A facsimile machine according to claim 13, wherein said memory device stores said operation control data selected from the group consisting of (a) data indicative of a number of rings before answer, (b) data indicative of a ring volume, and (c) data indicative of a speaker volume.

15. A data processing apparatus comprising:
- a connector which is adapted to be connected to a facsimile machine;
- a receiver which receives, from the facsimile machine via said connector, at least one set of operation control data needed to control at least one operation of the facsimile machine;
- a display which displays a first image corresponding to the received operation control data;
- an input device which is operable for inputting data to change said received operation control data, said display displaying a second image corresponding to the changed operation control data; and
- a transmitter which transmits said changed operation control data to the facsimile machine via said connector, wherein said data processing device further comprises judging means for judging whether said input device has been operated for said received operation control data, and wherein said transmitter transmits said operation control data to said facsimile machine when said judging means judges that said input device has been operated and does not transmit said operation control data to said facsimile machine when said judging means judges that said input device has not been operated.

16. A data processing apparatus according to claim 15, wherein said connector comprises a terminal which is connectable to the facsimile machine via a cable.

17. A data processing apparatus according to claim 15, wherein said display comprises means for displaying said first and second images each of which includes at least one item corresponding to said at least one operation of the facsimile machine.

18. A data processing apparatus according to claim 17, wherein said input device comprises at least one of a mouse which is operable by a user to move a pointer on a screen of said display while the user views said first image corresponding to said received operation control data, and a keyboard which is operable by a user to move a cursor on a screen of said display while the user views said first image corresponding to said received operation control data.

19. A data processing apparatus according to claim 15, comprising a personal computer providing said connector, said receiver, said display, said input device, and said transmitter.

20. A facsimile system comprising:
a facsimile machine including a data memory which stores at least one set of operation control data needed to control at least one operation of said facsimile machine; and
an external data processing device which is connectable to said facsimile machine and which is operable to change said operation control data and send the changed operation control data to said facsimile machine,
wherein said facsimile machine comprises a transmitter which reads said operation control data from said data memory and transmits the operation control data to the data processing device, and a receiver which receives changed operation control data changed by, and sent from, the data processing device and stores the changed operation control data in said data memory, and
wherein said receiver comprises judging means for judging, when receiving a set of operation control data from the data processing device, whether the received set of operation control data is a changed set of operation control data, and storing means for storing, in said data memory, said received set of operation control data judged to be said changed set of operation control data, and discarding said received set of operation control data judged to be not said changed set of operation control data.

21. A facsimile machine comprising:
a connector which is adapted to be connected to an external data processing device;
a data memory which stores at least one set of operation control data needed to control at least one operation of the facsimile machine, said operation control data comprising call-reception control data needed to operate the facsimile machine when the facsimile machine is called by a calling station;
a transmitter which reads said operation control data from said data memory and transmits the operation control data to the data processing device via said connector; and
a receiver which receives changed call-reception control data changed by, and sent from, the data processing device and stores the changed call-reception control data in said data memory.

22. A facsimile system comprising:
a facsimile machine including a data memory which stores at least one set of operation control data needed to control at least one operation of said facsimile machine; and
an external data processing device which is connectable to said facsimile machine and which is operable to change said operation control data and send the changed operation control data to said facsimile machine,
wherein said facsimile machine comprises a transmitter which reads said operation control data from said data memory and transmits the operation control data to the data processing device, and a receiver which receives changed operation control data changed by, and sent from, the data processing device and stores the changed operation control data in said data memory,
wherein said data memory stores each of a plurality of sets of operation control data needed to control a corresponding one of a plurality of operations of the facsimile machine, said transmitter reads said sets of operation control data from said data memory and transmits the sets of operation control data to the data processing device, so that a plurality of images corresponding to the sets of operation control data are displayed on a display of the data processing device and the user operates the data processing device to input data to change at least one of the sets of operation control data and send, to the facsimile machine, the sets of operation control data including the changed set of operation control data, and said receiver receives, from the data processing device, the sets of operation control data including said changed set of operation control data and stores the changed set of operation control data in said data memory, and
wherein said receiver comprises judging means for judging whether each of said sets of operation control data received from the data processing device, is a changed set of operation control data, and storing means for storing, in said data memory, said each set of operation control data judged to be said changed set of operation control data, and discarding said each set of operation control data judged to be not said changed set of operation control data.

23. A facsimile system according to claim 22, wherein said judging means comprises means for judging whether said each set of operation control data received from the data processing device is said changed set of operation control data, by comparing said each set of operation control data with a corresponding one of the sets of operation control data currently stored in said data memory.

24. A facsimile system comprising:
a facsimile machine including a data memory which stores at least one set of operation control data comprising calling-operation control data commonly needed to call each of a plurality of different called stations; and
an external data processing device which is connectable to said facsimile machine and which is operable to change said operation control data and send the changed operation control data to said facsimile machine,
wherein said facsimile machine comprises a transmitter which reads said operation control data from said data memory and transmits the operation control data to the data processing device, and a receiver which receives the changed operation control data changed by, and sent from, the data processing device and stores the changed operation control data comprising changed calling-operation control data changed by, and sent from, the data processing device.

said data memory comprising a memory device which stores said calling-operation control data selected from the group consisting of (a) data indicative of whether a pulse-dialing mode is selected, and (b) data indicative of whether an auto-redialing mode is selected.

25. A facsimile system comprising:

a facsimile machine including a data memory which stores at least one set of operation control data comprising call-reception control data needed to operate the facsimile machine when the facsimile machine is called by a calling station; and an external data processing device which is connectable to said facsimile machine and which is operable to change said operation control data and send the changed operation control data to said facsimile machine, wherein said facsimile machine comprises a transmitter which reads said operation control data from said data memory and transmits the operation control data to the data processing device, and a receiver which receives changed operation control data changed by, and sent from, the data processing device and stores the changed operation control data in said data memory, said changed operation control data comprising changed call-reception control data changed by, and sent from, the data processing device.

26. A facsimile system according to claim 25, wherein said data memory comprises a memory device which stores said call-reception control data selected from the group consisting of (a) data indicative of a number of rings before answer, (b) data indicative of a ring volume, (c) data indicative of a speaker volume, and (d) data indicative of a ring time.

27. A facsimile machine comprising:

a connector which is adapted to be connected to an external data processing device;

a data memory which stores at least one set of operation control data needed to control at least one operation of the facsimile machine;

a transmitter which reads said operation control data from said data memory and transmits the operation control data to the data processing device via said connector; and a receiver which receives changed operation control data changed by, and sent from, the data processing device and stores the changed operation control data in said data memory, wherein said receiver comprises judging means for judging, when receiving a set of operation control data from the data processing device, whether the received set of operation control data is a changed set of operation control data, and storing means for storing, in said data memory, said received set of operation control data judged to be said changed set of operation control data, and discarding said received set of operation control data judged to be not said changed set of operation control data.

28. A facsimile machine according to claim 27, wherein said judging means comprises means for judging whether said set of operation control data received from the data processing device is said changed set of operation control data, by comparing said set of operation control data with the corresponding set of operation data currently stored in said data memory.

29. A facsimile machine comprising:

a connector which is adapted to be connected to an external data processing device;

a data memory which stores at least one set of operation control data needed to control at least one operation of the facsimile machine, said operation control data comprising calling-operation control data commonly needed to call each of a plurality of different called stations;

a transmitter which reads said operation control data from said data memory and transmits the operation control data to the data processing device via said connector; and a receiver which receives changed calling-operation control data changed by, and sent from, the data processing device and stores the changed calling-operation control data in said data memory, said data memory comprising a memory device which stores said calling-operation control data selected from the group consisting of (a) data indicative of whether a pulse-dialing mode is selected, and (b) data indicative of whether an auto-redialing mode is selected.

30. A facsimile system according to claim 29, wherein said judging means comprises means for judging whether said set of operation control data received from the data processing device is said changed set of operation control data, by comparing said set of operation control data with the corresponding set of operation control data currently stored in said data memory.

31. A facsimile machine according to claim 30, wherein said data memory comprises a memory device which stores said call-reception control data selected from the group consisting of (a) data indicative of a number of rings before answer, (b) data indicative of a ring volume, (c) data indicative of a speaker volume, and (d) data indicative of a ring time.

32. A data processing apparatus comprising:

a connector which is adapted to be connected to a facsimile machine;

a receiver which receives, from the facsimile machine via said connector, at least one set of operation control data needed to control at least one operation of the facsimile machine, said operation control data comprising calling-operation control data commonly needed to call each of a plurality of different called stations;

a display which displays a first image corresponding to the received calling-operation control data;

an input device which is operable for inputting data to change said received calling-operation control data, said display displaying a second image corresponding to the changed calling-operation control data; and a transmitter which transmits said changed calling-operation control data to the facsimile machine via said connectors said data memory comprising a memory device which stores said calling-operation control data selected from the group consisting of (a) data indicative of whether a pulse-dialing mode is selected and (b) data indicative of whether an auto-redialing mode is selected.

33. A data processing apparatus comprising:

a connector which is adapted to be connected to a facsimile machine;

a receiver which receives, from the facsimile machine via said connector, at least one set of operation control data needed to control at least one operation of the facsimile machine, said operation control data comprising calling-reception control data needed to operate the facsimile machine when the facsimile machine is called by a calling station;

a display which displays a first image corresponding to the received call-reception control data;

an input device which is operable for inputting data to change said received call-reception control data, said display displaying a second image corresponding to the changed call-reception control data; and a transmitter which transmits said changed call-reception control data to the facsimile machine via said connector.

34. A facsimile machine according to claim 33, wherein said data memory comprises a memory device which stores said call-reception control data selected from the group consisting of (a) data indicative of a number of rings before answer, (b) data indicative of a ring volume, (c) data indicative of a speaker volume, and (d) data indicative of a ring time.

* * * * *